United States Patent [19]

Kaibel

[11] Patent Number: 5,897,748
[45] Date of Patent: Apr. 27, 1999

[54] DISTILLATIVE SEPARATION OF MIXTURES AND APPARATUS FOR THIS PURPOSE

[75] Inventor: Gerd Kaibel, Lampertheim, Germany

[73] Assignee: BASF Aktiengesellschaft, Ludwigshafen, Germany

[21] Appl. No.: 08/743,077

[22] Filed: Nov. 4, 1996

Related U.S. Application Data

[63] Continuation of application No. 08/439,903, May 12, 1995, abandoned.

[51] Int. Cl.⁶ .................................................... B01D 3/00
[52] U.S. Cl. .............................. 203/1; 196/111; 196/133; 202/158; 203/99; 261/97; 261/DIG. 72
[58] Field of Search .............................. 203/99, 100, 113; 202/158, 197; 261/97, DIG. 72, 114.3, 113, 108–110; 196/111, 125, 133

[56] References Cited

U.S. PATENT DOCUMENTS

| | | | |
|---|---|---|---|
| 2,639,130 | 5/1953 | Heere | 261/97 |
| 3,099,697 | 7/1963 | Lerman et al. | 261/97 |
| 3,325,376 | 6/1967 | Eckert | 202/158 |
| 3,759,498 | 9/1973 | Matsch | 261/114.3 |
| 3,916,021 | 10/1975 | Hajek et al. | 261/97 |
| 4,171,335 | 10/1979 | Planousky et al. | 202/158 |
| 4,229,386 | 10/1980 | Lerner | 261/DIG. 72 |
| 4,432,913 | 2/1984 | Harper et al. | 261/97 |
| 4,476,069 | 10/1984 | Harper et al. | 261/97 |
| 4,569,364 | 2/1986 | Keller et al. | 202/158 |
| 4,710,326 | 12/1987 | Seah | 261/112.2 |
| 4,776,989 | 10/1988 | Harper et al. | 261/97 |
| 5,192,465 | 3/1993 | Petrich et al. | 261/97 |
| 5,200,040 | 4/1993 | Naka et al. | 196/111 |
| 5,339,648 | 8/1994 | Lockett et al. | 202/158 |
| 5,518,667 | 5/1996 | Lehman | 202/158 |

FOREIGN PATENT DOCUMENTS

| | | |
|---|---|---|
| 133 510 | 2/1985 | European Pat. Off. |
| 598 382 | 5/1994 | European Pat. Off. |
| 1028093 | 4/1958 | Germany |
| 0136143 | 6/1979 | Germany |
| 0234413 | 4/1986 | Germany |

OTHER PUBLICATIONS

Chemical Eng. Progress, Mar. 1993, pp. 47–61.
Chemical Engineering Progress, Oct. 1994, pp. 62–66.
R. Perry and C. Chilton: Chemical Eng. Handbook, 5$^{th}$ Edition, McGraw–Hill, pp. 18–28 to 18–37 and K. Sattler: Thermische Trennverfahren, 2$^{nd}$ Ed., VCH Verlag, pp. 255–267.

*Primary Examiner*—Virginia Manoharan
*Attorney, Agent, or Firm*—Keil & Weinkauf

[57] ABSTRACT

To compensate the bypassing, at the edges, of the liquid flowing downward in a distillation column, in order to achieve optimum mass transfer with the ascending vapor, a specific nonuniform distribution of the liquid trickling density over the column cross-section is established including the steps of establishing a nonuniform distribution of the liquid trickling density over the column cross-section in the distillation column and adjusting the liquid trickling density in the wall regions, said nonuniform distribution being achieved by a) arranging a number of outlet orifices or the diameter of the outlet orifices of a liquid distributor or b) arranging baffles in the stripping sections at height intervals from 0.1 to 2 m, in the case of dumped packings with baffles which project into the column space from the wall by about from 0.5 to 3 times packing dimensions or c) choosing the thickness and position of an insulating layer of a column jacket in the rectifying sections of a column at operating temperatures above ambient temperature according to a temperature difference between column and environment so that a desired additional area-related liquid flow is achieved in an edge region of the column.

2 Claims, 3 Drawing Sheets

DISTILLATIVE SEPARATION OF MIXTURES AND APPARATUS FOR THIS PURPOSE

This application is a continuation of application Ser. No. 08/439,903, filed on May 12, 1995, abandoned.

The present invention relates to a process for the distillative separation of mixtures into the pure components by means of a distillation column which is completely or partly filled with packings comprising stacked or dumped separating elements, in which ascending vapor and downward-flowing liquid are brought into intimate contact between an evaporator and a condenser of the column and, as a result of the mass transfer which occurs, the lower-boiling components are obtained in the condenser and the higher-boiling components in the bottom of the column. The present invention furthermore relates to an apparatus for carrying out the process, consisting of a distillation column having liquid collectors and redistribution means.

Packed columns are widely used in distillative separation technology. In addition to irregular beds, for example of Raschig rings, Pall rings and ceramic saddles, stacked packings are also used as separating elements. These may be produced, for example, from perforated metal sheets, metal fabrics or plastic or ceramic material. Compared with plate-type columns, packed columns have advantages in particular with regard to the pressure loss, the low thermal stress to which sensitive substances are exposed and frequently also the capital costs. The range of uses covers both cases where only low purity of the fractions to be separated is required and applications having high purity requirements. Especially where very high purity requirements have to be met, there is still resistance to the use of packed columns in industry, since the required purities often could not be achieved by means of packed columns on the production scale and it was therefore necessary to use plate-type columns once again.

Overdimensioning, ie. increasing the height of the packing, was not sufficiently successful in these cases and is in any case undesirable for cost reasons. The manufacturers of packings therefore recommend, as a common remedy, repeated collection of the liquid and redistribution thereof via intermediate distributors. This is to date the most promising possibility for reliably achieving high product purities in packed columns. However, the disadvantages of using liquid collectors and distributors are their costs and the increased design height. Depending on the distributor type and on the column diameter, an additional design height of from 1 to 2.5 m must be allowed for each intermediate distribution.

It is an object of the present invention to provide a process and an apparatus for the distillative separation of mixtures, by means of which high purity of the components to be separated off from the mixture can be achieved even when distillation columns containing packings are used.

We have found that this object is achieved by a process of the type described at the outset in which, according to the invention, a specific nonuniform distribution of the liquid trickling density over the column cross-section is established in the distillation column. The achievement relating to the apparatus part of the object comprises specifically dimensioning the arrangement of the outlet orifices and/or their diameter in accordance with the desired liquid trickling density in the core region and in the wall region of the column.

Further details and advantages of the process and of the apparatus according to the invention are described below with reference to an embodiment shown schematically in the drawing.

DETAILED DESCRIPTION OF THE INVENTION

Figure 1:
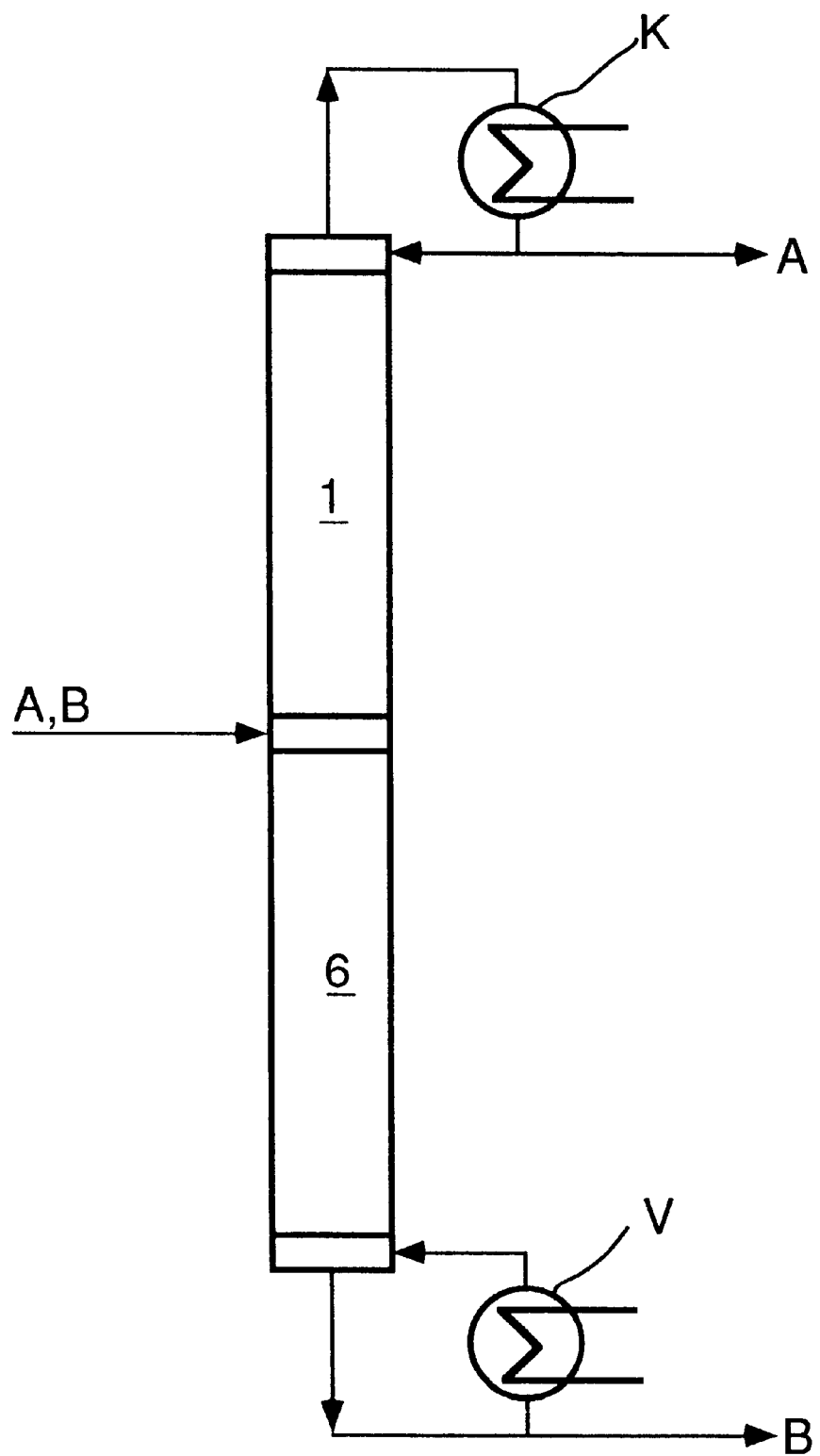
FIG. 1 shows the schematic structure of a distillation column.
Figure 2:
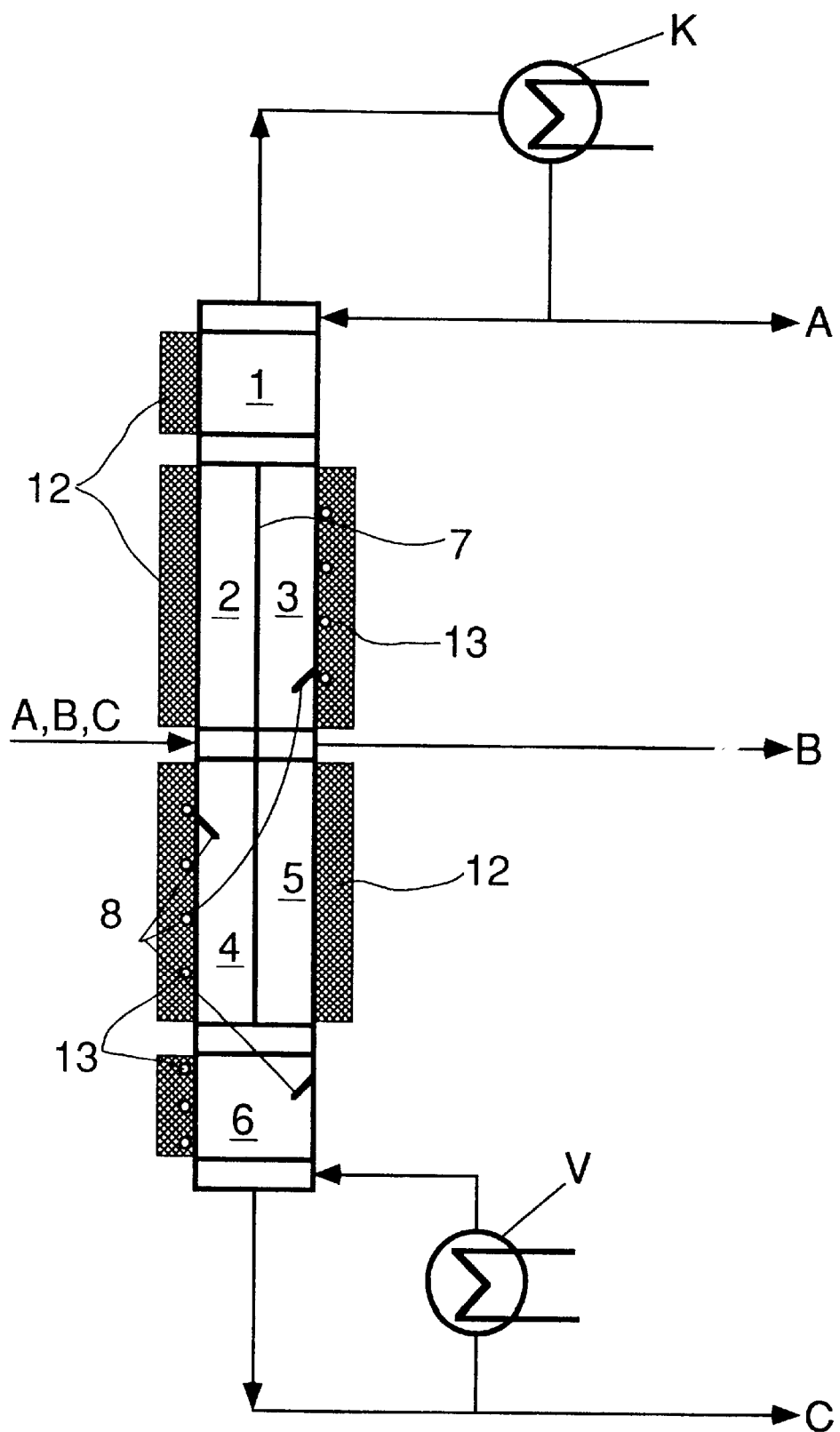
FIG. 2 shows the schematic structure of a distillation column having a partition and FIG. 3 shows liquid collectors and redistribution means in a column.

In the separation of mixtures in a distillation column (FIG. 1), ascending vapor and downward-flowing liquid are usually brought into intimate contact between an evaporator V at the bottom of the column and a condenser K at the top of the column. During the mass transfer which occurs, the lower-boiling components accumulate in the vapor and the higher-boiling components accumulate in the liquid. The former (A) are taken off via the top while the latter components B and C remain behind in the bottom of the column. The quality of the separation effect depends on the uniformity of the distribution of vapor and liquid over the entire cross-section of the column interior along the flow path and on the intensity of the mixing thereof. It is known, however, that increased flow of liquid and vapor is established in the region of the column wall and may be established at partitions 7 (FIG. 2), ie. bypassing at the edges, since the edge layer of the packing offers less resistance. In these regions, the liquid does therefore not take part sufficiently in the mass transfer.

The present invention provides a remedy here by specifically establishing a lower liquid flow density, for example from 10 to 100%, preferably from 20 to 50%, in these regions in the stripping sections 3, 4 and 6 of the column, ie. below the mixture feed, compared with the other regions. In the rectifying sections 1, 2 and 5 of the column, on the other hand, the liquid flow density is increased, for example by 10–1000%, preferably 20–50%.

When partitioned columns are used, a different liquid flow rate occurs in the region of the partition 7, along its entire length or in parts, an increased liquid flow rate being established above the feed point in the feed section 2 and below the side take-off point in the take-off section 5 and a reduced liquid flow rate being established below the feed point in the feed section 4 and above the side take-off point in the take-off section 3.

Figure 3:
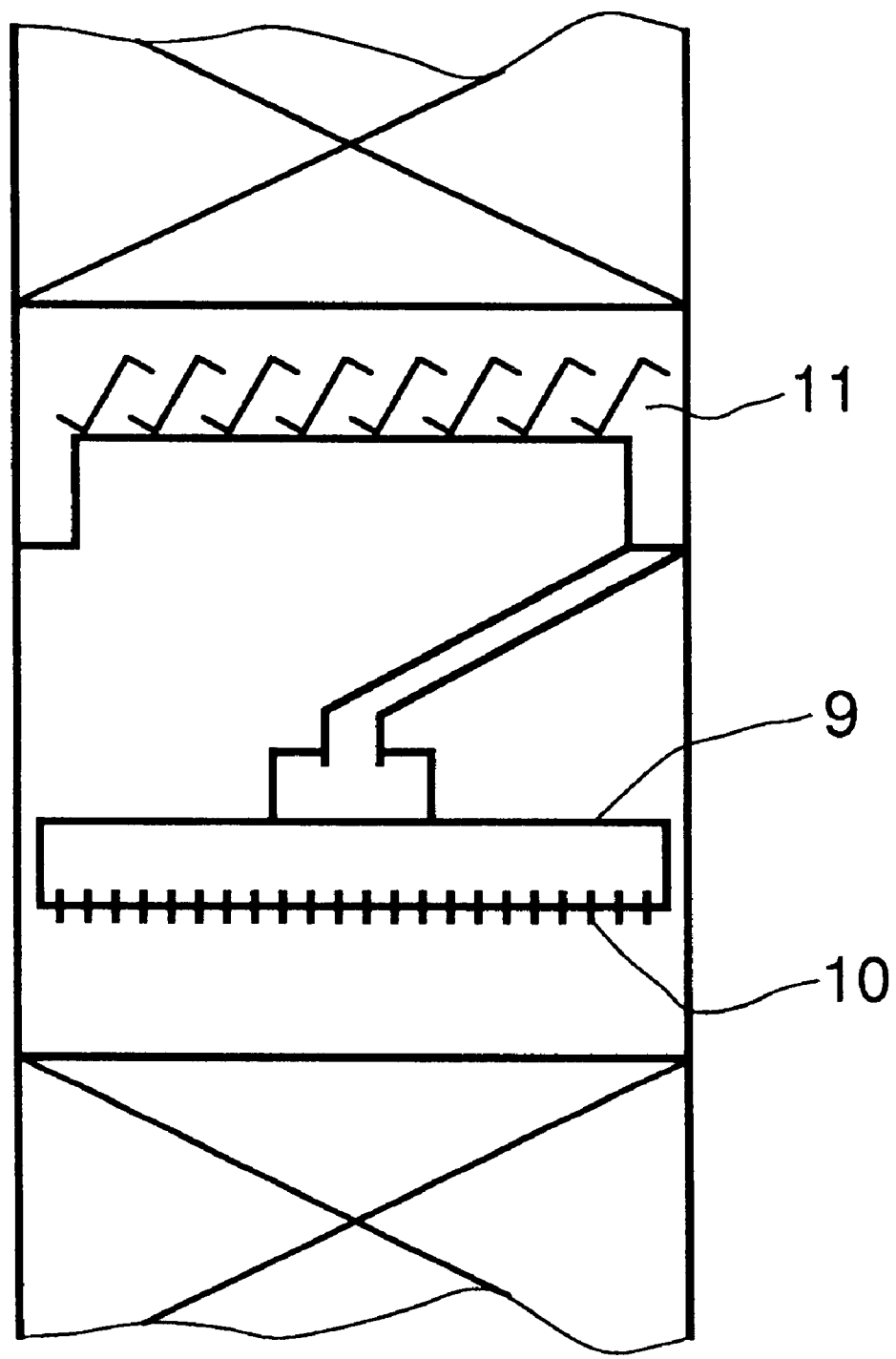

This specific nonuniform distribution of the liquid can be obtained by liquid distribution means 9 (FIG. 3) of different designs if, for example, the number and arrangement of the outlet orifices 10 and/or their diameter are appropriately designed. Distributors for the liquid are present at least at the upper end of the column and at the feed point. Where additional intermediate distributors with upstream liquid collector 11 are used, it is advantageous to provide these too with a corresponding nonuniform distribution of the liquid.

The nonuniform distribution of the liquid can also be achieved by design measures relating to the column wall and, if required, to partitions, for example by baffles 8 for the liquid at height intervals of from 0.1 to 2 m, preferably from 0.3 to 1 m, in the stripping section of the column. In the case of dumped packings, the baffle should project into the column space from the wall by about from 0.5 to 3, preferably from 1 to 1.5, times the packing dimensions.

A further possibility for establishing a specific nonuniform distribution of the liquid trickling density is to choose the thickness and position of the insulating layer 12 of the column jacket in the rectifying sections 1, 2 and 5 of the column at operating temperatures above the ambient temperature according to the temperature difference between column and environment, so that the desired additional area-related liquid flow is achieved in the edge region.

In the stripping sections 3, 4 and 6 of the column, the liquid trickling density in the wall region can be reduced by evaporation by means of a protective heater 13 at the column wall.

We claim:

1. In a process for separation of mixtures into pure components by means of a distillation column having stripping sections and rectifying sections, in which ascending vapor and downward flowing liquid are brought into intimate contact, said column having walls, an evaporator and a condenser, said column being completely or partially filled with packings comprising stacked or dumped separating elements, said mixture having a liquid trickling density in said column, wherein the improvement comprises the steps of establishing a nonuniform distribution of the liquid trickling density over the column cross-section in the distillation column and adjusting the liquid trickling density in the wall regions, said nonuniform distribution being achieved by a) arranging a number of outlet orifices or the diameter of the outlet orifices of a liquid distribution means or b) arranging baffles in the stripping sections at height intervals from 0.1 to 2 m, in the case of dumped packings with baffles which project into the column space from the wall by about from 0.5 to 3 times packing dimensions or c) choosing the thickness and position of an insulating layer of a column jacket in the rectifying sections of a column at operating temperatures above ambient temperature according to a temperature difference between column and environment so that a desired additional area-related liquid flow is achieved in an edge region of the column.

2. In a process for separation of mixtures into pure components by means of a distillation column having stripping sections and rectifying sections, in which ascending vapor and downward flowing liquid are brought into intimate contact, said column having walls and a partition, an evaporator and a condenser, said column being completely or partially filled with packings comprising stacked or dumped separating elements, said mixture having a liquid trickling density in said column, wherein the improvement comprises the steps of establishing a nonuniform distribution of the liquid trickling density over the column cross-section in the distillation column and adjusting the liquid trickling density in the wall regions and the partition regions, said nonuniform distribution being achieved by a) arranging a number of outlet orifices or the diameter of the outlet orifices of a liquid distribution means or b) arranging baffles in the stripping sections at height intervals from 0.1 to 2 m, in the case of dumped packings with baffles which project into the column space from the wall by about from 0.5 to 3 times packing dimensions or c) choosing the thickness and position of an insulating layer of the column jacket in the rectifying sections of a column at operating temperatures above ambient temperature according to a temperature difference between column and environment so that a desired additional area-related liquid flow is achieved in an edge region of the column.

* * * * *

UNITED STATES PATENT AND TRADEMARK OFFICE
CERTIFICATE OF CORRECTION

PATENT NO. : 5,897,748
DATED : April 27, 1999
INVENTOR(S) : Kaibel et al.

It is certified that error appears in the above-identified patent and that said Letters Patent is hereby corrected as shown below:

<u>Title page,</u>
Insert the following priority data
-- [30] Foreign Application Priority Data
May 27, 1994      [DE]    Germany ..................... P 44 18 488.3 --.

Signed and Sealed this

Fifth Day of February, 2002

Attest:

*Attesting Officer*

JAMES E. ROGAN
*Director of the United States Patent and Trademark Office*